United States Patent [19]

Bucher et al.

[11] Patent Number: 4,848,805
[45] Date of Patent: Jul. 18, 1989

[54] PACKING FOR TELESCOPICALLY LOCKED PIPE JOINTS

[75] Inventors: Claude Bucher; Andre Lagabe, both of Pont-A-Mousson, France

[73] Assignee: Pont-A-Mousson S.A., Nancy, France

[21] Appl. No.: 252,404

[22] Filed: Oct. 3, 1988

[30] Foreign Application Priority Data

Oct. 1, 1987 [FR] France ............................... 87 13756

[51] Int. Cl.4 ............................................. F16L 17/00
[52] U.S. Cl. ..................................... 285/105; 285/374
[58] Field of Search ......................... 285/104, 105, 374

[56] References Cited

U.S. PATENT DOCUMENTS 2,201,372  5/1940  Miller .................................... 285/105
2,491,004 12/1949  Graham ................................ 285/105
3,582,112  6/1971  Pilo ................................... 285/105 X
3,877,733  4/1975  Straub .................................. 285/105
3,963,298  6/1976  Seiler .................................. 285/105

FOREIGN PATENT DOCUMENTS 580046  7/1958  Italy ..................................... 285/105

Primary Examiner—Dave W. Arola
Attorney, Agent, or Firm—Sughrue, Mion, Zinn, Macpeak and Seas

[57] ABSTRACT

An elastomer packing 2 for male/female pipe joints is fitted with peripherally distributed, inserted or embedded locking elements E having a "seven" or T shape. The insertion of the male pipe into the female socket compresses the packing to establish a seal, and rotates the locking elements inwardly. Any withdrawal movements of the male pipe are halted by the counterrotation of the locking elements, whose beveled inner edges bite into the male pipe surface in a wedge like manner.

9 Claims, 4 Drawing Sheets

PACKING FOR TELESCOPICALLY LOCKED PIPE JOINTS

BACKGROUND OF THE INVENTION

This invention pertains to locked pipe joints, and especially concerns a packing for telescopic locked joints in which the end of a male pipe penetrates inside the end socket of a female pipe through the radial compression of the packing.

When a packed pipe joint has been made, the axial motion of the pipes in relation to each other must be prevented as they weaken the proper sealing of the joint, or may even disengage the initially joined pipes completely. This problem becomes especially acute when the pipes transport fluids under pressure. Indeed, the pressure of the fluid produces substantial forces, at each change in direction, which would tend to disengage the constituent elements of the joint.

Devices are known wherein the duct elements are arranged to thrust against foundations anchored in the ground. The major disadvantage of such devices is that they are very expensive, and they cannot always be installed.

Locking devices have also been proposed wherein annexed mechanical parts such as flanges are used to attach the tubular elements to be joined. Those devices are difficult to lay because they require the use of several mechanical parts with bolts, of which the implementation on site is quite delicate.

Moreover, one usually needs to alter the socket and the male end of the pipes to be joined by providing a ring-like groove on the male end, which tends to weaken the mechanical resistance of the joint.

Packed joints are also known in which locking elements located in the front part of the packing are inserted in a regular distribution at the open end of the socket. In such packings, as disclosed in French Pat. No. 2,186,621, the locking elements are fitted with several teeth, and are able to turn against an internal surface of the socket.

Experience has shown, however, that such packings display several problems when in use. First of all, the metal inserts, in the event of an optimal diameter for the male end, repel the sealing body from the packing in such a way that the seal is never completely guaranteed. Secondly, the range of diametric tolerance that is admitted by such a locking system is narrow, and in particular, it is lower than the range of tolerance in the manufacturing of pipes which requires the sorting of the pipes. Finally, where there is a withdrawal motion from the male end outside of the socket, the pivoting of the inserts is restricted by the nose of the socket. This means that the inserts will no longer hook the outer surface of the male end, rather they will rub against the male end, the locking system no longer being guaranteed as a result.

SUMMARY OF THE INVENTION

This invention is designed, therefore, to provide an elastomer packing inside which locking elements are inserted, which, on the one hand, enable efficient locking of male ended socket pipes in a range of significant diametric tolerance, and on the other hand, do not disrupt the sealing.

This invention provides a packing with an X—X axis fitted with locking elements, for the sealed joining between a male end of a first pipe and a socket of a second pipe that displays, after an intake collar, a groove that is coaxial to the socket. The packing displays, on its outer face, an anchoring heel which is extended by a sealing body that operates through radial compression, the anchoring heel being designed to lodge in the groove of the socket. The locking elements include an initial branch that is parallel to axis X—X and extends the first branch in an internal radial sense, the first branch being located inside the anchoring heel of the packing at its outer surface.

DETAILED DESCRIPTION OF THE PREFERRED EMBODIMENTS

Figure 1:
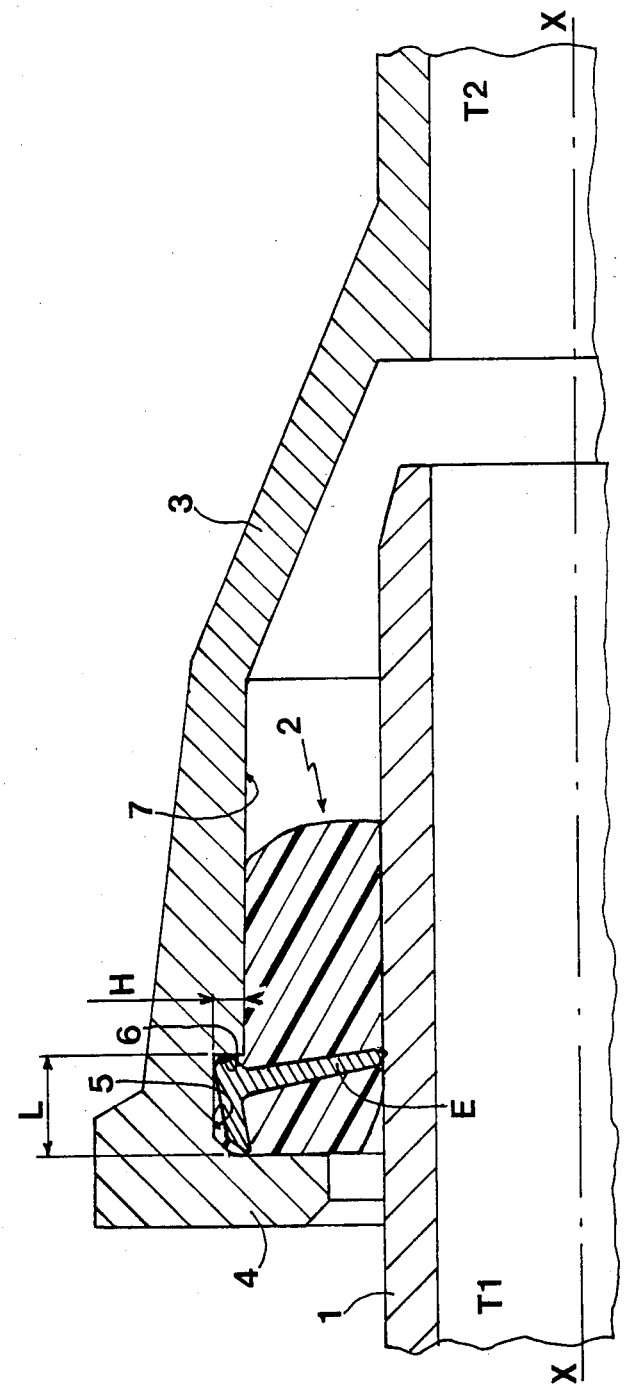
FIG. 1 is a partial view in axial section of the socket of a pipe in which the packing of the invention is housed after the insertion of the male end of another pipe.

Referring to FIG. 1, a sealing joint comprises a male end 1 of a pipe T1, a ring-like packing 2, made of an elastomer with a hardness of 55° to 75° SHORE A, fitted with metal locking elements E, and a socket 3 of a pipe T2, pipes T1 and T2 being coaxial along an axis X—X. The socket 3 defines, at its intake or mouth end, following a collar 4, a cylindrical groove 5, with an axial length L, coaxial to the socket 3. Groove 5 is followed, after a hook-off or shoulder 6, by a wall 7 whose diameter is smaller than the internal diameter of the groove 5. The wall 7 is cylindrical, and the shoulder has a height H.

Figure 2:
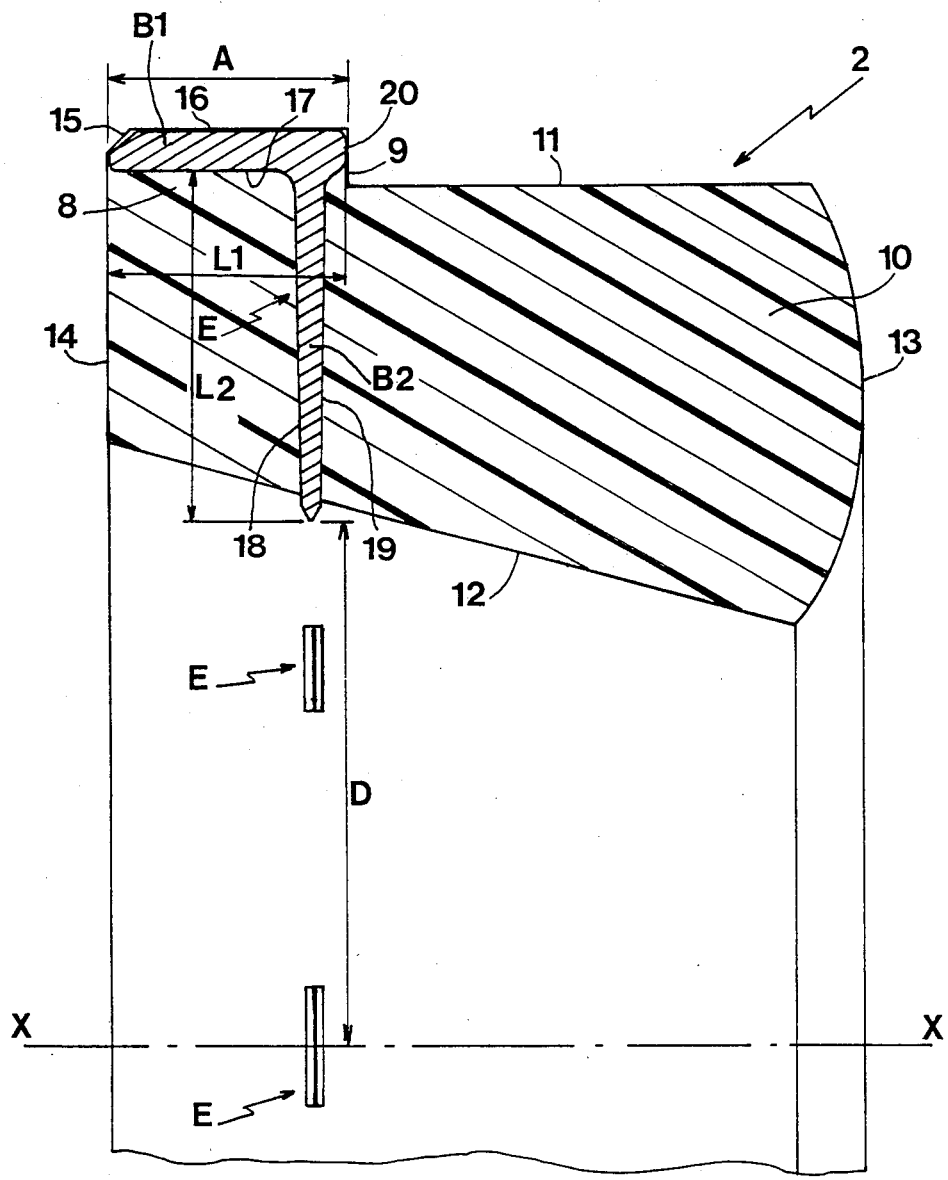
FIG. 2 is an axial section of the packing in the free state according to the invention.

The packing 2, as shown in section in FIG. 2, displays at its outer face an anchoring heel 8, having a width A that corresponds to that of groove 5. The external surface of the anchoring heel 8 is cylindrical, and it is extended by a sealing body 10 having an external cylindrical surface 11.

The anchoring heel 8 connects to the surface 11 with a crosswise cheek or shoulder 9 that forms a hook-off between the peripheral surfaces of the heel 8 and the body 10.

The external diameter of the anchoring heel 8 corresponds to the internal diameter of the groove 5 of the socket 3, the external surface of the packing 2, comprised of the anchoring heel 8, the cheek 9 and the surface 11, having a profile that corresponds to the profile of the socket 3 defined by the groove 5, the shoulder 6 and the wall 7. The internal face of the packing 2 has a truncated surface 12, which connects to the surface 11 of the body 10 by way of a curved surface 13.

The other end of the packing 2 opposite the curved surface 13, is defined by a radial surface 14 which connects to the anchoring heel 8 by way of a chamfer 15. The surface 14 and the chamfer 15 are designed to contact an internal face that corresponds to the collar 4 of the socket 3.

The outer diameter of the male pipe T1 lies between the inner diameters of the end surfaces 13, 14 of the packing.

The packing is formed with radial notches regularly distributed around the anchoring heel 8, in which the locking elements E are inserted. Alternatively, the packing could be moulded to surround or embed a casting of the locking elements E. Each locking element E is shaped like a "seven" comprising a horizontal branch B1 with a length L1 and a vertical, radial branch B2 with a length L2 that ends in a bevel. The vertical branch B2 is perpendicular to the horizontal branch B1, but the right angle can vary by $+/-10°$.

The length L1 of the horizontal branch B1 is slightly smaller than the axial width A of the anchoring heel 8, for example, 0.5 mm to 1 mm.

The external and internal surfaces 16, 17 of the branch B1 are substantially parallel, as are the surfaces 18 and 19 of the branch B2. The internal surface 17 of the branch B1 connects to the surface 18 of the branch B2, whereas the external surface 16 of the branch B1 connects to the surface 19 of the branch B2 by way of an embossed projection 20.

The horizontal branch B1 is designed to be housed in the anchoring heel 8 of the packing 2, their respective external surfaces being of the same diameter in relation to the packing axis. The protrusion 20 is designed to lean against the shoulder 6 of the socket 3. The lower end of the branch B2 lies at a distance D from the packing axis.

Preferably, the locking elements E have vertical branches B2 of several different lengths or heights. Thus, for a cast iron pipe T1 with an external diameter of 100 mm, a choice was made to lay fifteen locking elements, five with a height of 17.5 mm, five others with a height of 18.5 mm, and finally the last five with a height of 19.5 mm.

In use, after installing the packing 2 fitted with its locking elements E in the socket housing, the male end of the pipe T1 is inserted inside the socket 3 of the pipe T2 to compress the sealing body 10. The vertical branches B2 of the locking elements E, upon entering into contact with the male end of the pipe T1, will tilt by the sliding of their projections 20 against the shoulder 6 of the socket, as seen in FIG. 1.

When there is a small withdrawal motion of the male end (less than 2 mm, for instance) that stems from pressure or pressure changes in the duct, the beveled ends of the branches B2 of the locking elements E, which bear against the external surface of the male end, penetrate or bite slightly into the wall of the pipe. Such penetration only occurs for tilt values of the vertical branches B1 that are smaller than a certain ceiling, which is a function of the materials used and of the state of the surface of the male end.

The penetration is favored by the fact that the elastomer mass which is located in front of the packing 2, under the surface 17 of the horizontal branch B1 and in front of the surface 18 of the branch B2, tends to be compressed by the rotation of the locking elements E around their projections 20. The elastomer mass thus acts as a recoil spring which tends to automatically restore the branches B2 of the locking elements to their initial tilted positions.

Since the vertical branches B2 of the locking elements E have several lengths it is possible to guarantee the locking of the pipes in tolerance ranges that are simply a function of the number of locking elements E and the different lengths of their vertical branches B2, as there will always be a sufficient number of locking elements whose tilt is smaller than the ceiling value mentioned above. This also allows for an efficient locking on the entire periphery of the male end 1, even if the male end is off-center or deviated in relation to the socket.

If the locking strength is inadequate the male end 1 will have a tendency to pull out of the socket 3, whereupon the locking elements E will then rotate around the ends of their horizontal branches B1, opposite the projections 20, against the internal surface of the collar 4. The distance of the end of the bevel of the branch B2 in relation to the axis XX will thus lessen, increasing the locking strength with greater penetration of the elements E into the periphery of the male end 1, still increasing the corner effect.

Figure 3:
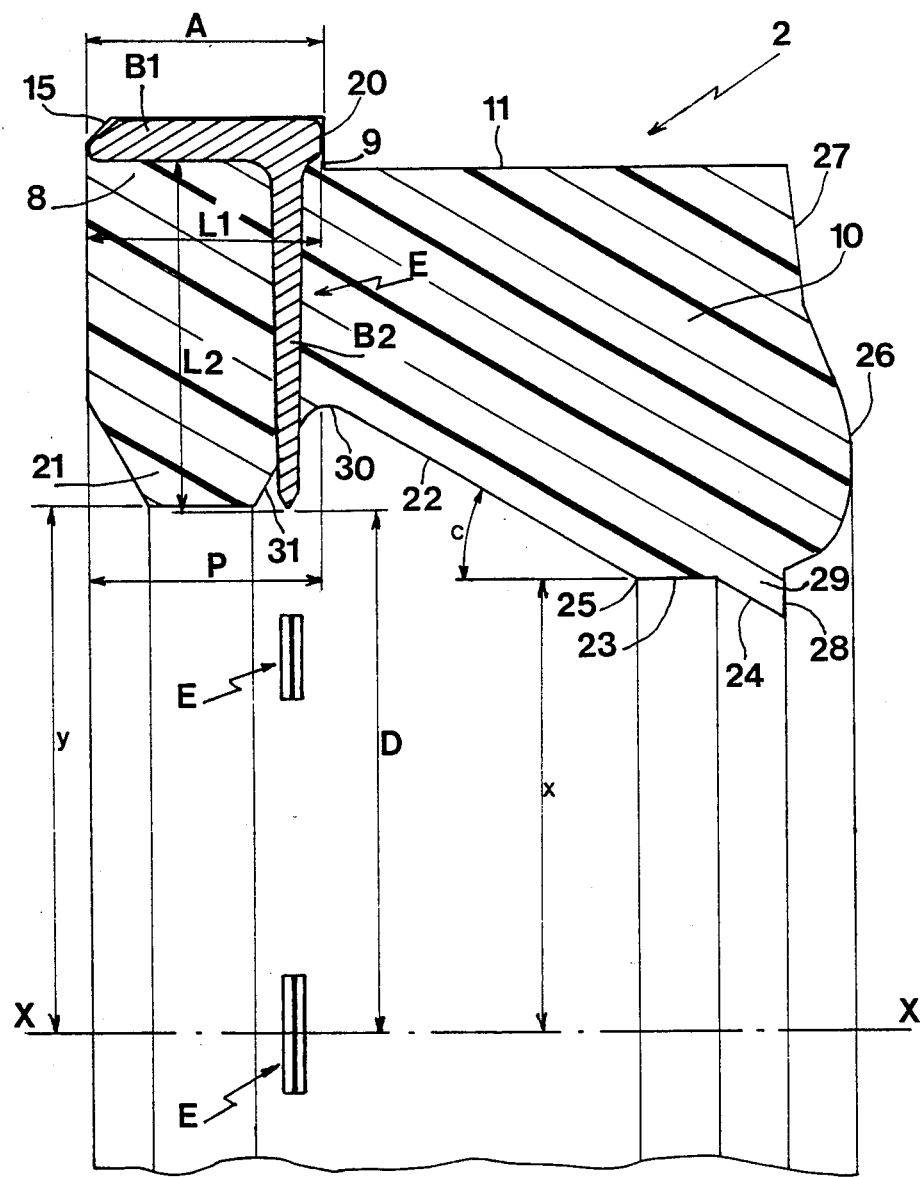
FIG. 3 is an axial section, analogous to FIG. 2, of a variant of the packing according to the invention.

According to the variant depicted in FIG. 3, the packing 2 displays a ring-like stand 21 with a trapezoidal section as an internal radial extension of the heel 8, having an internal diameter smaller than the minimum external diameter of the male end 1. The width P of the stand 21, at the base of its trapezoidal profile, is equal to the axial length A of the heel 8.

The body 10, with a basically trapezoidal section, has an initial internal surface 22 at an angle c of about 35° in relation to the axis X—X of the packing 2. This initial surface 22 is followed by a second internal surface 23 which is parallel to the packing axis and ends with a truncated internal surface 24 at an angle of about 20° with the packing axis. The edge 25 formed by the intersection of the surfaces 22 and 23 has a diameter x that is less than the minimum diameter y of the stand 21. The radial face of the end of the body 10 opposite the heel stand 21 defines a ring-like lobe 26. A surface 28 forms with the surface 24 a small triangular lip 29. The packing 2 also defines a triangular groove 30, located between the stand 21 and the body 10, restricted by a dihedron comprising a flank 31 of the stand 21 and the surface 22 of the body 10. The beveled ends of the vertical branches B2 exit the packing behind the stand 21 in the groove 30.

In operation, the insertion of a male end of a pipe T1 inside a socket 3, fitted with the packing 2, compresses the stand 21 which pushes back the anchoring heel 8 to the bottom of the groove 5 inside the socket 3, which ensures the stability of the packing inside the socket. When the male end 1 contacts the beveled ends of the locking elements E, the vertical branches B2 will have a tendency to tilt, the locking elements rotating by sliding their projections 20 against the shoulders 6 of the socket 3. The recall or recoil function of the elastomer mass included in front of each locking element E is established by the compression of the stand 21. The groove 30 allows each vertical branch B2 to tilt without having to push back the sealing body 10, which avoids any disruption of the seal. Finally, the stand 21 protects the anchoring zone, where the end bevels of the locking elements E penetrate the surface of the male end 1, against the aggressions of the external fluids of the duct.

Figure 4:
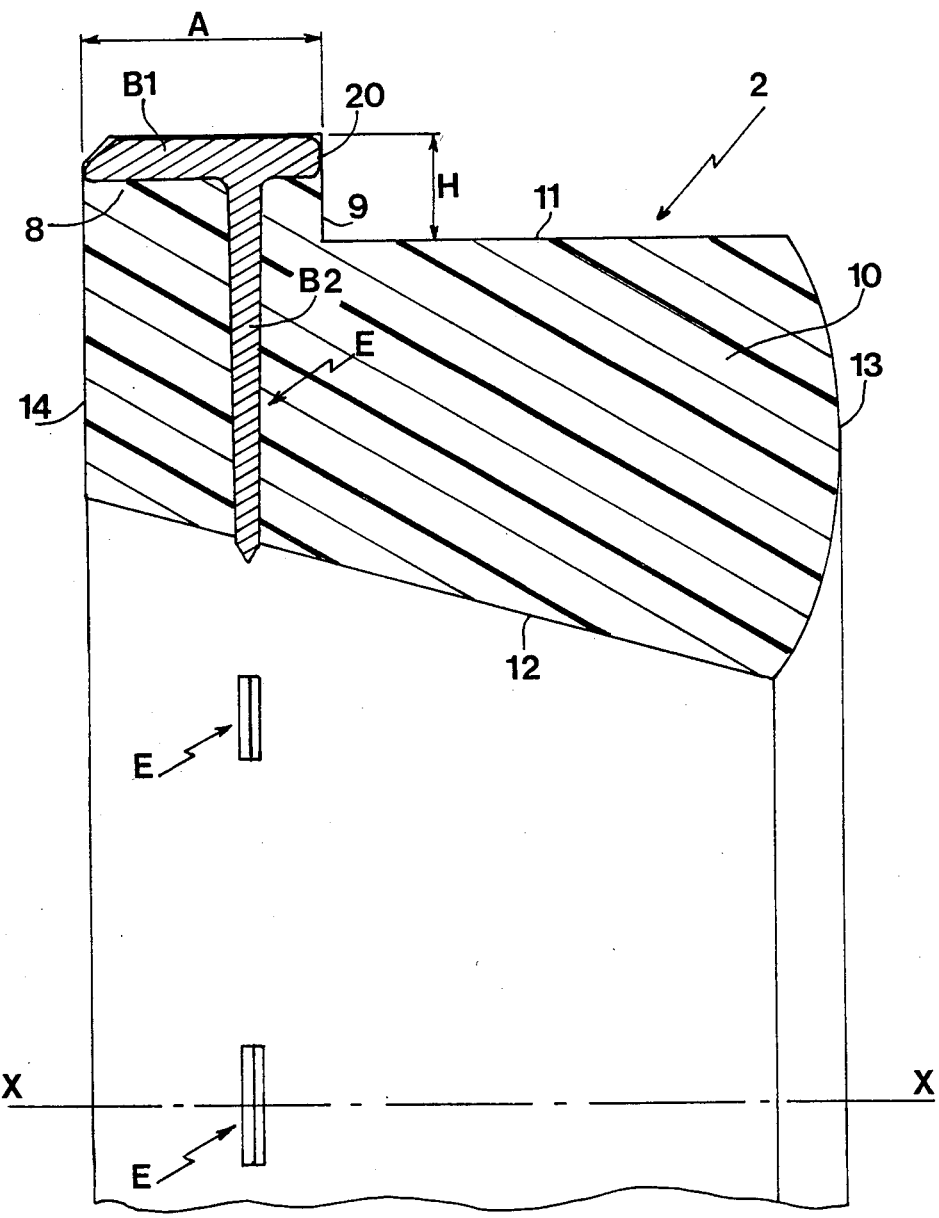
FIG. 4 is an axial section view, analogous to FIGS. 2 and 3, of a second variant of the packing according to the invention.

According to the variant of FIG. 4, to increase the anchoring of the packing 2 inside the socket 3, the heel 8 and the groove 5 have a height H greater than that shown in FIG. 1. The projection 20 would then be inadequate to allow the rotation of the locking element E and the tilt of the branch B2. Indeed, the branch B2 would immediately contact the edge of the socket 2 at the shoulder 6 and the face 7. This problem is solved by advancing the branch B2, the projection 20 extending concurrently, to produce a locking element E which takes on the shape of a "T". The operation of a joint fitted with such a packing is substantially identical to that previously described.

What is claimed is:

1. A ring-like packing (2) symmetrical about an axis X—X for a sealed joint between a male end (1) of a first pipe (T1) an a socket end (3) of a second pipe (T2), said socket end defining a mouth collar (4) followed by a groove (5) coaxial to the socket end, said groove having at least a shoulder and an inner corner, said packing defining an anchoring heel (8) extended by a radially compressible sealing body (10), the anchoring heel being configured to seat in the groove, characterized by a plurality of locking elements (E) individually distributed around the periphery of the packing, each locking element comprising an elongate first branch (B1) parallel to the axis X—X and an elongate second branch (B2) disposed at an angle of 80° to 100° to the axis X—X and extending the first branch in a radially inward direction, the first branch being disposed in the anchoring heel at a radially outermost surface thereof and the second branch extending radially through the packing and having a bevelled inner edge projecting slightly beyond an inner peripheral surface of the packing, a juncture between the first and second branches defining a projection (20) disposed against a shoulder (6) at an inner corner of the groove such that, upon the insertion of the male end of the first pipe into the socket end of the second pipe, the locking element pivots about the projection with the inner edge of the second branch being exclusively forced inwardly of the socket end by the first pipe insertion and without the application of any internal or external fluid pressure.

2. A packing according to claim 1, wherein the first branch comprises a radially external surface (16) and a radially internal surface (17), the second branch comprises axially outermost and innermost surfaces (18, 19), the internal surface of the first branch joins the outermost surface of the second branch, and the external surface of the first branch joins the innermost surface of the second branch across said projection (20).

3. A packing according to claim 2, wherein each locking element has the shape of a "seven".

4. A packing according to claim 3, wherein the locking elements have second branches with several different lengths.

5. A packing according to claim 2, wherein each locking element (E) has the shape of a "T".

6. A packing according to claim 5, wherein the locking elements have second branches with several different lengths.

7. A packing according to claim 1, wherein the anchoring heel defines an elastomer mass disposed in a forward portion of said packing between a radially internal surface (17) of the first branch and an axially outermost surface (18) of the second branch.

8. A packing according to claim 7, wherein the locking elements have second branches with several different lengths.

9. A packing according to claim 1, wherein the locking elements have second branches with several different lengths.

* * * * *